US009656740B2

(12) United States Patent
Gölling

(10) Patent No.: US 9,656,740 B2
(45) Date of Patent: *May 23, 2017

(54) AIRCRAFT WITH WINGS AND A SYSTEM FOR MINIMIZING THE INFLUENCE OF UNSTEADY FLOW STATES

(71) Applicant: Airbus Operations GmbH, Hamburg (DE)

(72) Inventor: Burkhard Gölling, Buchholz i.d.N. (DE)

(73) Assignee: Airbus Operations GmbH, Hamburg (DE)

( * ) Notice: Subject to any disclaimer, the term of this patent is extended or adjusted under 35 U.S.C. 154(b) by 855 days.

This patent is subject to a terminal disclaimer.

(21) Appl. No.: 13/734,522

(22) Filed: Jan. 4, 2013

(65) Prior Publication Data

US 2013/0187009 A1    Jul. 25, 2013

Related U.S. Application Data

(63) Continuation of application No. PCT/EP2011/003351, filed on Jul. 6, 2011.

(30) Foreign Application Priority Data

Jul. 6, 2010   (DE) .................. 10 2010 026 162

(51) Int. Cl.
*B64C 21/00*   (2006.01)
*B64C 13/16*   (2006.01)
(Continued)

(52) U.S. Cl.
CPC ............. *B64C 13/16* (2013.01); *B64C 21/04* (2013.01); *B64C 21/08* (2013.01);
(Continued)

(58) Field of Classification Search
CPC ......... B64C 13/16; B64C 21/00–21/10; B64C 23/005; B64C 2230/00; B64C 2230/04;
(Continued)

(56) References Cited

U.S. PATENT DOCUMENTS 4,932,610 A * 6/1990 Maestrello .............. B64C 21/00
114/67 A
5,135,186 A * 8/1992 Ako ..................... G05D 1/0825
244/195

(Continued)

FOREIGN PATENT DOCUMENTS

CN    1 243 485 A    2/2000
CN     1243485 A     2/2000
(Continued)

OTHER PUBLICATIONS

Chinese Search Report for Application No. 201180041481.5 dated Sep. 18, 2014.
(Continued)

*Primary Examiner* — Philip J Bonzell
*Assistant Examiner* — Michael A Fabula
(74) *Attorney, Agent, or Firm* — Jenkins, Wilson, Taylor & Hunt, P.A.

(57) ABSTRACT

An aircraft and system for minimizing the influence of unsteady flow states, wherein the wing has a respective main wing and at least one control flap adjustably arranged relative thereto, an adjusting drive for activating the at least one control flap, and a sensor arrangement for acquiring the setting position of the control flap. The system exhibits at least one arrangement of flow-influencing devices for influencing the fluid flow over the surface segment, a detection device for detecting unsteady flow states acting on the aircraft, and an actuating function connected with the flow-influencing devices to influence the flow in the different (Continued)

segments of a wing, designed so that the latter, based on the unsteady flow states detected by the detection device and setting position of the control flap acquired by the sensor arrangement, actuates the flow-influencing devices so as to minimize the influence of unsteady flow states on the aircraft.

20 Claims, 7 Drawing Sheets

Related U.S. Application Data

(60) Provisional application No. 61/361,689, filed on Jul. 6, 2010.

(51) Int. Cl.
 *B64C 21/04* (2006.01)
 *B64C 21/08* (2006.01)
(52) U.S. Cl.
 CPC ...... *B64C 2230/04* (2013.01); *B64C 2230/06* (2013.01); *Y02T 50/166* (2013.01)
(58) Field of Classification Search
 CPC ............ B64C 2230/06; B64C 2230/12; B64C 2230/20; B64C 2230/22; B64C 2230/24; B64C 2230/26
 See application file for complete search history.

(56) References Cited

U.S. PATENT DOCUMENTS

| | | | | |
|---|---|---|---|---|
| 5,375,794 A * | 12/1994 | Bleeg | ................... | G05D 1/0066 244/195 |
| 5,727,381 A * | 3/1998 | Rogers | ..................... | B63H 1/28 114/151 |
| 5,740,991 A | 4/1998 | Gleine et al. | | |
| 5,875,998 A | 3/1999 | Gleine | | |
| 5,995,880 A * | 11/1999 | Larramendy | ........ | G05D 1/0623 244/181 |
| 6,044,311 A * | 3/2000 | Larramendy | ........ | G05D 1/0615 244/175 |
| 6,135,395 A | 10/2000 | Collett | | |
| 6,161,801 A * | 12/2000 | Kelm | ..................... | B64C 13/16 244/195 |
| 6,234,751 B1 * | 5/2001 | Hassan | ................... | B64C 23/04 244/130 |
| 6,267,331 B1 | 7/2001 | Wygnanski | | |
| 6,375,127 B1 * | 4/2002 | Appa | ........................ | B64C 3/48 244/203 |
| 6,390,417 B1 * | 5/2002 | Yoshino | .................. | B64C 13/16 244/195 |
| 6,412,732 B1 * | 7/2002 | Amitay | ................. | B64C 23/005 244/200 |
| 6,416,017 B1 * | 7/2002 | Becker | ................... | B64C 13/16 244/194 |
| 7,290,738 B1 * | 11/2007 | Rogers | ................... | B63B 1/248 244/198 |
| 7,510,149 B2 * | 3/2009 | Miller | .................... | B64C 21/02 244/204 |
| 7,624,941 B1 * | 12/2009 | Patel | ..................... | B62D 35/007 244/200.1 |
| 7,673,832 B2 | 3/2010 | Meister | | |
| 8,033,510 B2 * | 10/2011 | Shmilovich | ............... | B64C 9/16 244/200.1 |
| 8,645,007 B2 * | 2/2014 | Golling | ................. | B64C 21/025 701/10 |
| 8,774,987 B2 * | 7/2014 | Walton | .................... | B64C 13/16 244/76 C |
| 2004/0079835 A1 * | 4/2004 | Volk | ......................... | B64C 9/22 244/76 C |
| 2006/0060723 A1 * | 3/2006 | Greenblatt | .............. | B64C 3/141 244/207 |
| 2006/0102801 A1 * | 5/2006 | Manley | ................... | B64C 21/04 244/208 |
| 2006/0202082 A1 * | 9/2006 | Alvi | ........................ | B64C 21/04 244/12.1 |
| 2007/0034746 A1 * | 2/2007 | Shmilovich | ............... | B64C 9/16 244/207 |
| 2007/0051855 A1 * | 3/2007 | Shmilovich | ............... | B64C 9/16 244/207 |
| 2007/0221788 A1 | 9/2007 | Meister | | |
| 2009/0157239 A1 * | 6/2009 | Walton | ................... | G05D 1/046 701/6 |
| 2009/0173837 A1 * | 7/2009 | Silkey | ................... | B64C 23/005 244/205 |
| 2009/0292405 A1 * | 11/2009 | Najmabadi | ............. | B64C 13/16 701/3 |
| 2010/0004799 A1 * | 1/2010 | Drouin, Jr. | ............ | B64C 23/005 701/3 |
| 2010/0090068 A1 | 4/2010 | van der Velden et al. | | |
| 2012/0256056 A1 * | 10/2012 | Seifert | .................. | B64C 21/025 244/204.1 |
| 2013/0035808 A1 * | 2/2013 | Golling | ..................... | B64C 9/16 701/3 |
| 2013/0037658 A1 * | 2/2013 | Golling | .................. | B64C 13/50 244/213 |
| 2013/0166110 A1 * | 6/2013 | Golling | ................. | B64C 21/025 701/3 |

FOREIGN PATENT DOCUMENTS

| | | |
|---|---|---|
| CN | 1 950 254 A | 4/2007 |
| CN | 1950254 A | 4/2007 |
| CN | 1 989 041 A | 6/2007 |
| CN | 1989041 A | 6/2007 |
| DE | 10 2009 057 405 | 6/2011 |
| DE | 10 2010 026 162 | 1/2012 |
| EP | 0887257 | 12/1998 |
| WO | WO 2006/032486 | 3/2006 |
| WO | WO 2011/069650 | 6/2011 |
| WO | WO 2012/003973 | 1/2012 |

OTHER PUBLICATIONS

International Search Report for Application No. PCT/EP2011/003351 dated Oct. 13, 2011.
European Office Action for Application No. 11730586.2 dated Sep. 10, 2014.
European Office Action for Application No. 11730586.2 dated Jan. 2, 2014.
Chinese Office Action for Application No. 2011 80041431.5 dated Sep. 26, 2014.

* cited by examiner

AIRCRAFT WITH WINGS AND A SYSTEM FOR MINIMIZING THE INFLUENCE OF UNSTEADY FLOW STATES

CROSS-REFERENCE TO RELATED APPLICATIONS

This application is a continuation of and claims priority to PCT application No. PCT/EP2011/003351 filed Jul. 6, 2011, which claims the benefit of and priority to German Patent Application No. DE 10 2010 026 162.9 filed Jul. 6, 2010, and of United States Provisional Patent Application No. U.S. 61/361,689 filed Jul. 6, 2010, the disclosures of which applications are hereby incorporated herein by reference.

TECHNICAL FIELD

The invention relates to an aircraft with wings and a system for minimizing the influence of unsteady flow states.

BACKGROUND

Known from WO2006/032486A1 is an aircraft in which the maximum lift of its wings can be changed by way of actuatable wing components.

U.S. Pat. No. 5,875,998 describes an aircraft whose wings can be adjusted to the air flowing around the wings by changing their curvature with respect to preset pressure values.

SUMMARY

The object of the invention is to provide measures that can be used to minimize the influence of unsteady flow states on the aircraft, and in particular the aircraft structure and/or the flight state. In particular, the object according to the invention is here to better control the wing load of regulated aircraft.

This object is achieved with the features in the independent claims. Additional embodiments are indicated in the subclaims referring back to the latter.

The invention provides an aircraft with wings and a system for minimizing the influence of unsteady flow states, wherein the wings are each comprised of a main wing and at least one control flap adjustably arranged relative thereto, a adjusting drive for actuating the at least one control flap, and a sensor arrangement for acquiring the setting position of the control flap, wherein the aircraft further exhibits:
  a presetting device or command device for generating desired parameters or nominal parameters corresponding to flight states of the aircraft, in particular for generating nominal states corresponding to flight states of the aircraft,
  a flight state sensor arrangement for generating flight state data,
  a flight control device, which is functionally connected with the presetting device, the adjusting drive and the sensor arrangement for acquiring the setting position or nominal position of the control flap, so as to set the aircraft to the flight states corresponding to the desired parameters.

The system for minimizing the influence of unsteady flow states exhibits:
  at least one arrangement of flow-influencing devices for influencing the fluid flow over the surface segment, which are functionally connected with the flight control device, and incorporated in at least one surface segment of the main wing of each wing extending in a respective wingspan direction and/or at least one control flap,
  a detection device for detecting unsteady flow states or unsteady free flow states acting on the aircraft,
  an actuating function that is functionally connected with the flow-influencing devices to influence the flow in the different segments of a wing, designed in such a way that the latter, based on the unsteady flow states detected by the detection device and setting position of the control flap acquired by the sensor arrangement, actuate the flow-influencing devices so as to minimize the influence of unsteady flow states or unsteady free flow states on the aircraft.

Another aspect of the invention provides an aircraft with wings and a system for minimizing the influence of unsteady flow states, wherein the wings are each comprised of a main wing and at least one control flap adjustably arranged thereto, a adjusting drive for actuating the at least one control Clap, a sensor arrangement for acquiring the nominal or setting position of the control flap, and at least one trailing edge flap, wherein the aircraft further exhibits:
  A presetting device or command device for generating desired or nominal parameters corresponding to flight states of the aircraft,
  A flight state sensor arrangement for generating flight state data,
  A flight control device or a flight controller, which is functionally connected with the presetting device, the flight state sensor arrangement, the adjusting drive and the sensor arrangement for acquiring the setting position of the control flap, so as to set the aircraft to the flight states corresponding to the desired parameters,
wherein the system for minimizing the influence of unsteady flow states exhibits:
  at least one arrangement of flow-influencing devices for influencing the fluid flow over the surface segment, which are functionally connected with the flight control device, and incorporated in at least one surface segment of a trailing edge flap of each wing extending in a respective wingspan direction,
  a detection device for detecting unsteady flow states or unsteady free flow states acting on the aircraft,
  an actuating function that is functionally connected with the flow-influencing devices to influence the flow in the different segments of the trailing edge flap, designed in such a way that the latter, based on the unsteady flow states detected by the detection device and setting position of the control flap acquired by the sensor arrangement, actuate the flow-influencing devices so as to minimize the influence of unsteady flow states or unsteady free flow states on the aircraft.

In this embodiment, the system for minimizing the influence of unsteady flow states can exhibit:
  at least one arrangement of flow-influencing devices for influencing the fluid flow over the surface segment, which are functionally connected with the flight controller, and incorporated in at least one surface segment of the main wing of each wing extending in a respective wingspan direction and/or at least one control flap,
  an actuating function that is functionally connected with the flow-influencing devices to influence the flow in the different segments of a wing, designed in such a way that the latter, based on the unsteady flow states detected by the detection device and setting position of the control flap acquired by the sensor arrangement, actuate the flow-influencing devices so as to minimize the influence of unsteady flow states on the aircraft.

The invention can provide in particular that the actuating function be functionally integrated with the flight control device, so that commands for the flow-influencing devices can be taken into account in commands for the adjustable flap in terms of controlling the aircraft.

The advantages achievable by the invention involve the following aspects:

Suppressing the influence of gusts, turbulence and other unsteady flow conditions of the aircraft, Improving the agility of flying objects in order to fly through transient and/or unsteady flight states in a controlled manner, Increasing the performance of flying objects and their operational capability, Expanding the possible radius of action in terms of the angle of attack given a specific, desired lift, drag or glide ratio, Increasing the efficiency of control surfaces, thereby enabling the use of smaller control surfaces or more agile flight characteristics, In addition, the invention permits flight procedures for optimizing the wing load with respect to the structural design, with the objective of building an especially lightweight wing on the one hand, and providing a wing that can stand up to the challenges of executing flight maneuvers and negotiating wind gusts, flying through both in a controlled manner.

Active load control mechanisms involve integrating materials that can change shape during the application of an electrical voltage or electrical current, so that the desired deformation of the control flaps or a segment of a region of the wing is realized as a function of the magnitude of the voltage or current strength.

For example, the parametric variables of a pulsating flow control actuator based on compressed air are the mass flow, the frequency, the duty cycle and the shape of the excitation signal, which change the global/local lift coefficient by varying the mass flow, which realizes the disruptive flow at the given boundary dimensions of the flow control system and the boundary conditions in terms of integrating the actuator system into the structure.

According to the invention, gusts, turbulences and unsteady flow states in general can also be suppressed via load control and/or flow control by integrating load control actuators into the structure of a wing or by integrating flow control actuators into the leading edge of a wing, in particular in the outer wing area, or with an actuated winglet device. This can take place completely or partially for purposes of replacement in terms of the replacement depth or replacement degree on the wing or corresponding device.

The nominal value for the load state and/or flow state can generally consist of a wing load control function, which based on an aircraft-related state determines a desired load distribution on the wing in the form of the flow value relating to a respective segment as the desired value with which a predetermined load distribution is set on the wings.

Alternatively or additionally, the nominal value for the flow state can consist of a gust amelioration function, which determines a required change in the lift coefficient for the respective segment based on a flight-related state. The gust-amelioration device or function of the flight controller is implemented for generating desired commands, which are used to offset unsteady loads on the wings owing to gusts. In particular as the input variables, the gust-amelioration device can here determine acceleration variables and/or rotational speed variables from the flight position sensor arrangement (inertial measurement unit IMU) and/or from inertial sensors, such as acceleration variables and/or rotational speed variables from sensor arrangements arranged locally at suitable locations in the wing and/or fuselage.

One embodiment of the invention provides that at least one surface segment of the main wing of each wing extending at least in a respective wingspan direction incorporates an arrangement of flow-influencing devices for influencing the fluid flow over the surface segment, and at least one flow state sensor arrangement for measuring the flow state on the respective surface segment, which is functionally connected with the actuating device, wherein the actuating device for each segment determines actual values for the flow state in the respective segment from the flow state sensor arrangement respectively accompanying the latter, and actuates the flow-influencing devices in such a way that the desired values ascertained by the actuating device are desired for minimizing the influence of unsteady flow states.

According to the invention, one of the described embodiments can provide:

That the detection device for detecting unsteady flow states acting on the aircraft is functionally connected with the flight state sensor arrangement and exhibits a filter function used to identify unsteady flow states, That the actuating function for influencing the flow in the different segments of a wing is functionally connected with the detection device and designed to use the identified unsteady flow states to actuate the flow-influencing devices in such a way as to influence the flow of the fluid steaming over the surface segment to reduce the effects of the unsteady flow states on the aircraft.

According to the invention, one of the described embodiments can further provide:

That the detection device for detecting unsteady flow states acting on the aircraft is functionally connected with the flow state sensor arrangement and exhibits a filter function used to identify unsteady flow states, That the actuating function for influencing the flow in the different segments of a wing is functionally connected with the detection device and designed to use the identified unsteady flow states to actuate the flow-influencing devices in such a way as to influence the flow of the fluid steaming over the surface segment to reduce the effects of the unsteady flow states on the aircraft.

According to the invention, one of the described embodiments can also provide:

That the detection device exhibits sensors for detecting loads and/or displacements of turbulences acting on the aircraft, That the actuating function for influencing the flow in the different segments of a wing is functionally connected with the detection device and designed to use the identified unsteady flow states to actuate the flow-influencing devices in such a way as to influence the flow of the fluid steaming over the surface segment to reduce the effects of the unsteady flow states on the aircraft.

According to the invention, the detection device can be designed in such a way as to ascertain desired values for the flow state on the surface segments as a function of the flight state data transferred by the flight state sensor arrangement in order to set a distribution of lift over the span of the main wing, and use the flow state data ascertained by the respective flow state sensor arrangements to find deviations, and from that to derive unsteady flow states acting on the aircraft.

In particular, the detection device can exhibit acceleration sensors, which are arranged on the wing for measuring accelerations that locally arise on the wing due to unsteady flow states acting on the aircraft.

One aspect of the invention provides that the arrangement of flow-influencing devices is comprised of flow passage openings situated in one segment or several segments, and of a flow-generating device (for exhaust and/or aspiration purposes) situated in the wing, through which fluid is purged from the flow passage openings, so as to influence the lift coefficient locally arising at the segment.

Additionally or alternatively thereto, another aspect of the invention provides that the arrangement of flow-influencing devices exhibits flow passage openings arranged in a segment or several segments, and a suction device situated in the wing and flow-connected with the aspirating openings, through which fluid is aspirated from the flow passage openings to influence the lift coefficient locally arising at the segment.

According to the invention, the flow-generating device can be designed to generate a continuous volumetric flow in order to reduce the effects of unsteady flow states on the aircraft when it is activated by the actuating function.

Another exemplary embodiment provides that the flow-generating device be designed in such a way as to generate a pulsed volumetric flow in order to reduce the effects of unsteady flow states on the aircraft when it is activated by the actuating function. The actuating function can in particular exhibit a function that generates the frequency of the pulsed volumetric flow as a function of the values for unsteady flow states ascertained by the detection device in order to reduce the influence of unsteady flow states on the aircraft.

In another exemplary embodiment of the invention, the flow-generating device exhibits a synthetic actuator, which, in order to reduce the effects of the unsteady flow states on the aircraft, is designed to generate an aspiration and purging of a volumetric flow, which is accommodated by means of an actuator in an actuator chamber of the synthetic actuator, or ejected from the latter.

According to the invention, the arrangement of flow-influencing devices can also consist of loudspeaker devices situated in one segment or several segments, which when activated generate air oscillations that can influence the lift coefficient locally arising at the segment.

As an alternative thereto, the arrangement of flow-influencing devices can consist of piezo actuators situated on the surface of the wing, which are arranged in one segment or several segments, and when activated generate air oscillations that can influence the lift coefficient locally arising at the segment.

Another exemplary embodiment of the invention can provide that the arrangement of flow-influencing devices additionally exhibit a adjustable flap and actuator for adjusting the latter, wherein the desired commands for the flow-influencing devices are comprised of desired commands for the flow-generating device and desired commands for an actuator for adjusting the adjustable flap.

According to the invention, the at least one segment can consist of several segments arranged one in back of the other as viewed in the wingspan direction.

BRIEF DESCRIPTION OF THE DRAWINGS

The invention will be explained below based on the attached figures, which show.

Components and functions on the figures with the identical or similar function are labeled with the same reference number.

DETAILED DESCRIPTION

Figure 1:
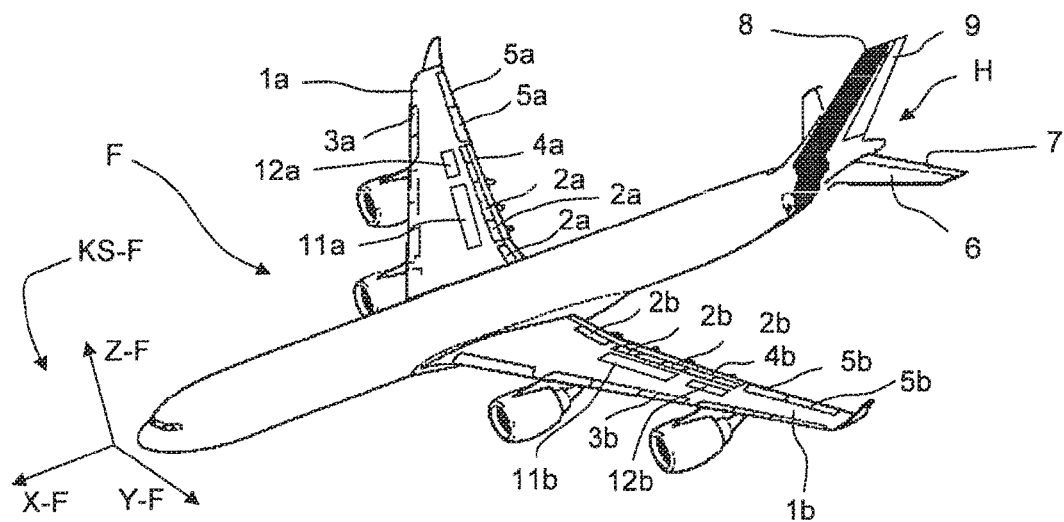
FIG. 1 a perspective view of an aircraft that integrates flow-influencing devices provided according to the invention.

In its usual configuration, the exemplary embodiment of a regulated aircraft F shown by example on FIG. 1, to which the invention can be applied, has two wings $1a$, $1b$, each with at least one aileron $5a$ or $5b$. Each wing $1a$, $1b$ of the aircraft shown on FIG. 1 further exhibits a respective three leading edge lift bodies $3a$, $3b$ and three trailing edge lift bodies $4a$, $4b$ as the high-lift flaps. As an option, the wings $1a$, $1b$ can each exhibit a plurality of spoilers $2a$, $2b$. In addition, the aircraft F exhibits a tail stabilizer H with a rudder unit 8 having a rudder 9 and an elevator unit 6 with at least one respective elevator 7. For example, the elevator unit 6 can be designed as a T-shaped tail unit or, as depicted on FIG. 1, as a cruciform tail unit. In the embodiment of the aircraft shown, the spoilers $2a$, $2b$, ailerons $5a$ or $5b$, rudders 9 and elevator 7 each serve as control flaps S.

Figure 2A:
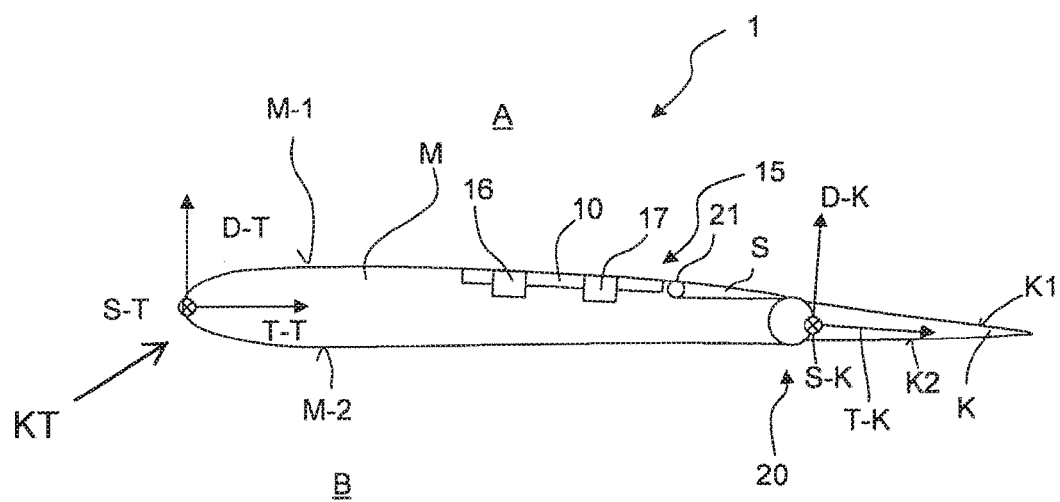
FIG. 2A a diagrammatic depiction of the cross section for a wing with a main wing, which exhibits an arrangement of flow-influencing devices and flow state sensors according to the invention provided in at least one segment of the latter, as well as with a control valve, which can be adjusted from an adjusting device using a adjusting drive.

Recorded on FIG. 1 is an aircraft-related coordinate system KS-F with a longitudinal aircraft axis X-F, a transverse aircraft axis Y-F and a vertical aircraft axis Z-F. Each wing $1a$, $1b$ can have allocated to it a wing coordinate system KT with an axis S-T for the span direction, an axis T-T for the depth direction, and an axis D-T for the thickness direction of B the wing (FIG. 2A). In addition, each flap can have allocated to it a flap coordinate system KS-K with an axis S-K for the span direction of the flap an axis T-K for the depth direction, and an axis D-K for the thickness direction of the flap (FIG. 2A).

The aircraft F according to the invention can also have a different shape and another arrangement of control valves and/or regulating valves than the aircraft F shown on FIG. 1.

FIG. 2A diagrammatically shows a wing 1, which is comprised of a main wing M and an aerodynamic body provided for controlling or maneuvering the aircraft or a control flap S. The control flap S can be adjusted relative to the main wing M by means of a adjusting B drive 21 of a positioning device 20. The control valve takes the form of a spoiler on FIG. 2A, and could alternatively or additionally be an aileron and/or—even if not arranged on the main wing—an elevator 7 and/or rudder 9 from a functional standpoint according to the invention. In order to control the aircraft in the spatial coordinates, not just control flaps arranged on the main wing must be actuated, but in particular also the rudders on the rudder unit 9. When the description and definition of the invention makes reference to actuating the control flaps arranged on the main wing, it allows for and does not rule out other control surfaces not arranged on the main wing being actuated and/or activated in the same functional correlation, in particular at the same time. According to the invention, the aerodynamic body or control flap S adjustably arranged on the aircraft can be a high-lift flap, an aileron, a spoiler, an elevator or rudder, or also some other control means for controlling the flight path of the aircraft. As an option, the wing 1 as depicted on FIG. 2A can also be coupled to a high-lift flap or a general adjustable flap or adjustable flap K, the position of which relative to the main wing M can be adjusted in order to set the lift configuration of the main wing M. The lift configuration of the main wing M is adjusted for a flight phase like takeoff or landing, or a partial flight phase, such as the final approach or special flight phases, such as steep approaches, and does not serve to control and/or regulate the aircraft relative to control settings or flight states to be observed.

The main wing M exhibits an upper side M-1 running on the suction side A of the latter, a lower side M-2 running on the pressure side B of the latter, and if necessary, a rear side facing the high-lift flap K. A flap-depth direction T-K or general depth direction, a span direction S-K or general span direction and a flap thickness direction D-K or general flap thickness direction are defined for the high-lift flap or generally for the adjustable flap K and control flap S. The adjustable flap K or high-lift flap has an upper side K1 running on the suction side A of the high-lift flap K, and a lower side K2 running on the pressure side B of the high-lift flap K.

In order to further explain the invention, reference is made to the combination B diagrammatically depicted on FIG. 2A of a main wing M, at least one spoiler as the control flap S, and a high-lift flap as the adjustable flap K. The at least one control flap S in this application can alternatively or additionally be an aileron and/or the rudder. Alternatively or additionally to the high-lift flap, the tail plane and/or rudder unit, and generally also the adjustable flap or adjustable flap of the aircraft according to the invention, can be functionally included as the adjustable flap K.

According to the invention, an aircraft has a flight control device or generally a flight controller, and a presetting device 30 that is connected with the flight control device, and in particular exhibits an activating device or control input device 31 for generating desired control commands $31a$ for controlling the aircraft F. The control input device 31 of the aircraft F is usually comprised of a control input device 31 arranged in the cockpit of the aircraft used to input control guidelines for controlling the flight path of the aircraft, which in particular can exhibit pilot input means, such as joysticks and optional pedals.

In addition, the presetting device 30 can exhibit an operating mode input device and/or an autopilot 33, which generates desired autopilot commands $33a$ for controlling the aircraft F or is functionally connected with the flight control device 50 so as to send the desired commands $31a$ or $33a$ to the latter.

The desired control commands $31a$ of the control input device 31 and/or desired autopilot commands $33a$ of the autopilot 33 are used to generate desired commands in the flight control device 50 so as to actuate or move adjusting drives and in particular an actuator for adjusting or actuating the flow-influencing devices and/or the actuator or flap drive for adjusting the adjustable flaps S to be actuated, and relay them to the latter.

The aircraft F further exhibits a flight state sensor arrangement 40 functionally connected with the flight control device 50 for generally acquiring flight state date, with an air data sensor arrangement 41 for acquiring aerodynamic data or air data, in particular for ascertaining static and dynamic pressures, the temperature and the velocity in terms of the air, as well as a flight position sensor arrangement of inertial sensor arrangement 42, in particular for acquiring the inertial position and its derivations for the aircraft F, and in particular accelerations and rotational speeds of the aircraft F. The air data sensor arrangement 41 exhibits air data sensors for determining the flight state of the aircraft F, and in particular the dynamic pressure, static pressure and temperature of the air streaming around the aircraft F. The flight position sensor arrangement 42 is used in particular to find the rotational speeds of the aircraft F, including the yaw rate and roll rate of the aircraft, so as to determine its flight position. The flight control device 50 receives the flight state sensor signals 40a of the sensor values acquired by the flight state sensor arrangement 40, in particular the air data sensor signals 41a of the air data sensor arrangement 41 and flight position sensor data 42a of the flight position sensor arrangement 42.

The respective control flaps present on the aircraft, e.g., the ailerons 5a, 11b, the spoilers 12a or 12b, have allocated to them at least one adjusting drive and/or a driving device, which according to the invention are each optionally actuated by the flight controller 50 via command signals, which are desired commands, so as to adjust the respectively allocated control flaps to control the aircraft F. It can here be provided that one of these control flaps have allocated to it a respective actuating drive or, in order to increase the failure safety of the aircraft system, a plurality of adjusting drives.

The flight control device 50 has a control function that receives control commands from the control input device 30, and sensor values 40a from the sensor arrangement 40. The control function is designed in such a way as to generate positioning commands for the adjusting drives as a function of the control commands 30a and the acquired and received sensor values 40a, and relays them to the latter, so that activating the adjusting drives causes the aircraft F to be controlled via the control commands.

In flight, the pilot uses an actuating device 31 to generate a desired command 31a for controlling the aircraft. The desired command 31a for aircraft control can be a three-dimensional acceleration vector for effecting a relative change in the flight state of the aircraft, or directional change parameters. The desired command vector can also be composed of both preset values, and here generate directional change parameters for the lateral movement, and acceleration parameters for the vertical movement of the aircraft, for example. The flight control device 50 can in particular be configured in such a way as to generate a current input signal vector CS based on the desired parameters 30a for commanding the adjusting drive 21, and transmit it to the latter, at which the aircraft assumes a desired state corresponding to the desired parameters 30a.

In addition, it can be provided that desired commands or desired command vectors 33a be generated by means of an autopilot 33.

Generalized concept of the invention (FIG. 3 to 7).

The flight control device is functionally connected with the presetting device 30, the flight status sensor arrangement 40, and a positioning device 20 with the adjusting drive 21 for adjusting the control flap S and a sensor arrangement for acquiring the setting position of the control flap S, so as to adjust the aircraft to flight states corresponding to the desired parameters 30a. Also functionally connected with the flight control device are several arrangements 15 of flow-influencing devices 16; 16K, which each extend at least into a surface segment 10; 11a, 12a; 11b, 12b of the main wing M of each wing M that extends in a wingspan direction, and influence the fluid flow over the surface segment 10, and at least one flow state sensor arrangement 17 for measuring the flow states on the respective surface segment 10; 11a, 12a; 11b, 12b.

As shown on FIG. 3 to 7, the flight control device 50 according to the invention generally actuates at least one adjusting drive 21 of a control flap S for controlling the aircraft as a function of the desired parameters 30a. Activating the at least one control flap S changes the flight state, meaning in particular the position and altitude, along with the flight position and the first and second derivations thereof, in such a way as to comply with the desired parameters 30a. In this way, the flight control device 50 uses a flight state regulating function 70 to adjust the flight state of the aircraft for purposes of controlling the aircraft. In so doing, the flight state regulating function 70 generates positioning commands 350 (FIG. 3), 470 (FIG. 4) or 570 (FIG. 5) for activating the positioning device 20 of the control flaps S or their individual adjusting drives 21.

Figure 2B:
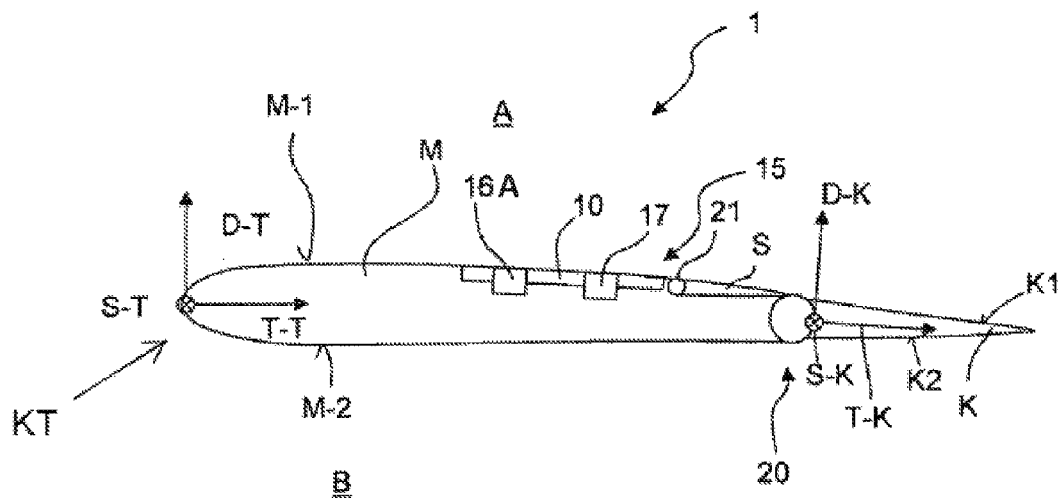
FIG. 2B a diagrammatic depiction of the cross section for a wing with a main wing, which exhibits an arrangement of flow-influencing devices, consisting of a loudspeaker, and flow state sensors according to the invention provided in at least one segment of the latter, as well as with a control valve, which can be adjusted from an adjusting device using a adjusting drive.
Figure 2C:
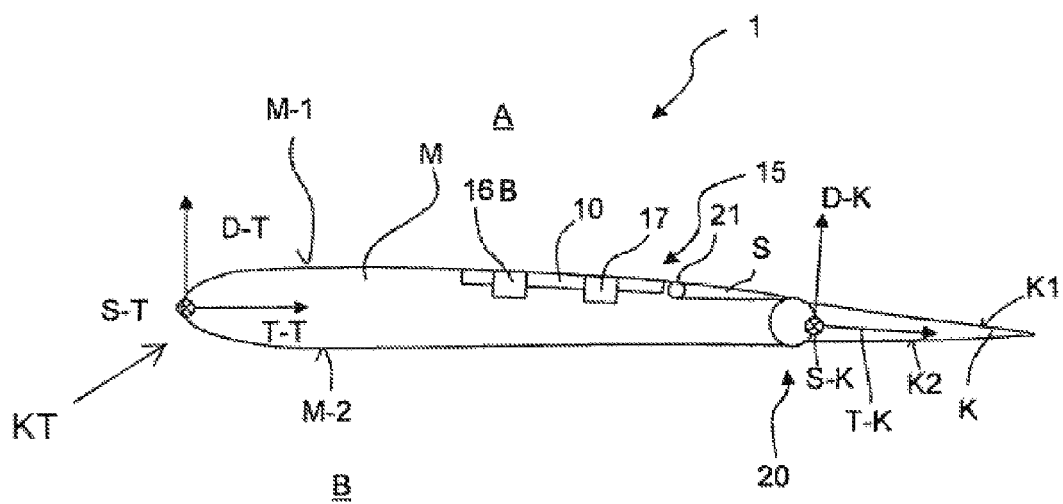
FIG. 2C a diagrammatic depiction of the cross section for a wing with a main wing, which exhibits an arrangement of flow-influencing devices, consisting of a piezo actuator and flow state sensors according to the invention provided in at least one segment of the latter, as well as with a control valve, which can be adjusted from an adjusting device using a adjusting drive.

According to the invention, a detection device is provided for detecting unsteady flow states acting on the aircraft. Also provided according to the invention is an actuating function that is functionally connected with the flow-influencing devices 16 for actuating the latter. In particular, the actuating function can be functionally integrated into the flight control device 50. Pursuant to the invention, the actuating function is configured in such a way as to use the unsteady flow states detected by the detection device to actuate the flow-influencing devices 16 in such a way as to minimize the influence of unsteady flow states on the aircraft. The arrangement of flow-influencing devices can also consist of loudspeaker devices 16A (see, e.g., FIG. 2B) situated in one segment or several segments, which, when activated, generate air oscillations that can influence the lift coefficient locally arising at the segment. As an alternative thereto, the arrangement of flow-influencing devices can consist of piezo actuators 16B (see, e.g., FIG. 2C) situated on the surface of the wing, which are arranged in one segment or several segments, and, when activated, generate air oscillations that can influence the lift coefficient locally arising at the segment.

The detection device can be configured in different ways according to the invention. In particular, the detection device for detecting unsteady flow states acting on the aircraft can be functionally connected with the flight state sensor arrangement 40, and exhibit a filter function used to identify the unsteady flow states. The detection device for detecting unsteady flow states acting on the aircraft can in particular exhibit a filter function, with which unsteady flow states are identified.

Figure 5:
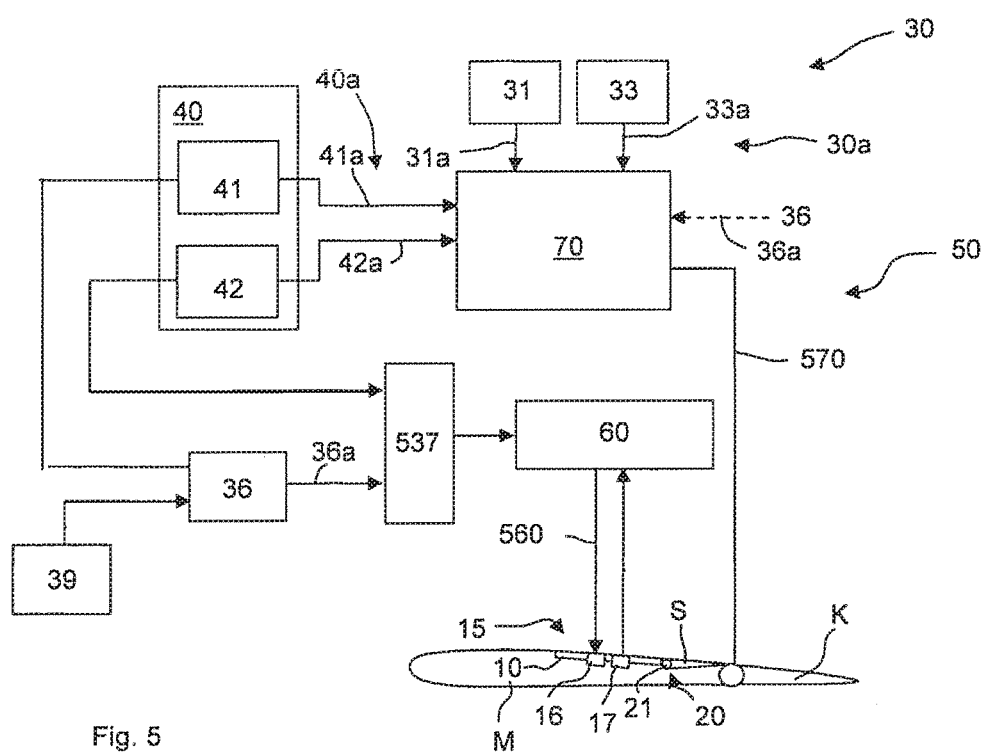
FIG. 5 another exemplary embodiment of a flight controller provided according to the invention with a flight control device, which exhibits a flight state regulator for generating positioning signals on at least one actuator of a adjustable flap functionally connected with the flight state regulator, and a flow state regulator for influencing flight loads and/or minimizing the effects of unsteady flow states that is functionally connected with a segment actuating function, which is functionally connected with a load distribution function and/or gust ameliorating function, and receives positioning commands from the latter for activating the flow state sensor arrangement.

Alternatively or additionally, the detection device can exhibit sensors 39 for detecting loads and/or displacement of turbulences acting on the aircraft (FIG. 5).

In another aspect of the invention, the detection device can be designed in such a way as to determine desired values for the flow state on the surface segments 10; 11a, 12a; 11b, 12b as a function of the desired parameters 30a of the presetting device and the flight state data transmitted by the flight state sensor arrangement 40 in order to adjust a distribution of the lift over the span of the main wing M, and determine deviations based on the flow state data determined by the respective flow state sensor arrangements 17, and from that the unsteady flow states acting on the aircraft.

Figure 3:
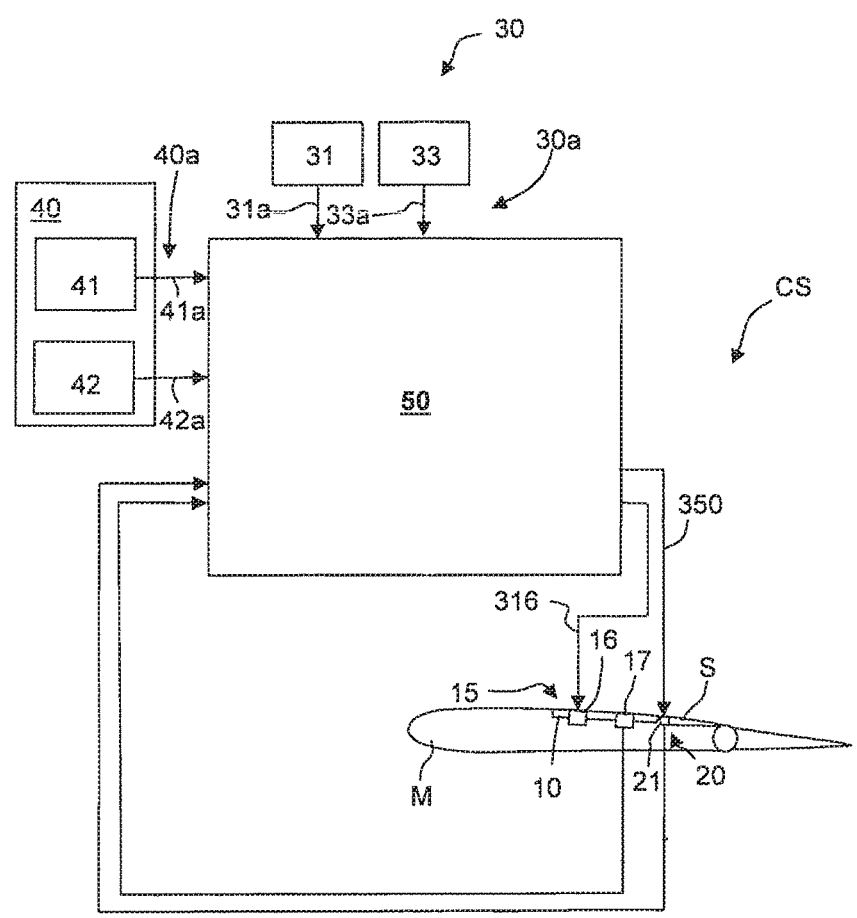
FIG. 3 an embodiment of the flight controller provided according to the invention, with a flight control device that uses sensor signals of a flight state sensor arrangement to transfer positioning commands to the adjusting drives of the control flap, and, in order to influence wing loads and/or minimize the effects of unsteady flow states, further generates positioning commands to actuate flow-influencing devices situated in at least one segment of the wing surfaces according to the invention and transfer them thereto.

In the embodiment shown on FIG. 3, the flight control device 50 generates positioning commands CS for the respective actuators of the flow-influencing device 16 of the various segments 10, as well as the adjusting drives 21 of the control surfaces. The actuating function correspondingly activates or moves the adjusting drives of the flow-influencing devices in a predetermined way, thereby changing the local lift coefficients or conditions relating to the drag coefficient and lift coefficient in the very segment 10 in which the respectively actuated adjusting drive or actuator with its altered positioning state is arranged. Therefore, the flight control device 50 uses the control and regulating algorithms implemented therein to actuate the mentioned adjusting drives of the control flaps S as a function of time, so as to set a flight state according to the desired command 31a and/or 33a for controlling the aircraft F, and here stabilize the aircraft in a flight position and/or execute a path control motion and/or adjust the load distribution of the wing and/or compensate for gusts.

As a result, the flight control device provided by the invention generally exhibits an actuating function to generate desired commands for driving devices so as to adjust flow-influencing devices 15 of the at least one surface segment 10, and a regulating function to generate desired commands for driving devices so as to adjust at least one control flap S per wing, which uses the desired commands for controlling the aircraft to determine corresponding desired commands for actuating positioning devices on the wings, the activation of which changes or influences the flight state of the aircraft based on the desired command.

The at least one actuator of the flow-influencing devices 16 of one respective segment 10 and all of the respective segments is actuated and activated via the actuating function in order to compensate for deviations from the ascertained desired values of the acquired flow state data. The actuating function ascertains desired commands for the actuator of the flow-influencing device 16 of a wing, which correspond to a local lift coefficient required at a point in time for the area of the respective segment. Actuating and commanding the actuator of each respective segment activates the respectively actuated actuator, as a result of which the respectively accompanying flow-influencing devices 16 influence the flow state at the local segment, thereby influencing and changing in particular the flow state existing at the respective segment 10.

Figure 4:
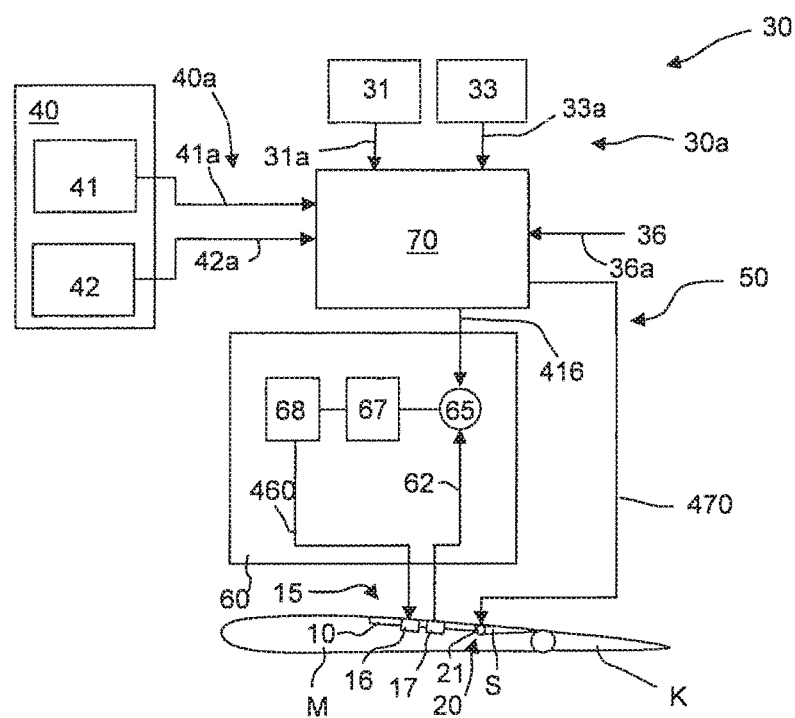
FIG. 4 an embodiment of a flight controller provided according to the invention with a flight control device, which exhibits a flight status regulator and flow state regulator for influencing flight loads and/or minimizing the effects if unsteady flow states, wherein the flow state regulator uses the input signals of the flight state regulator and the sensor signals of the flow state sensor arrangement for each segment to generate flow state positioning commands to actuate the flow-influencing device of each segment, and relays them thereto.

An exemplary embodiment of the invention can provide that the process of reaching a commanded local flow state be monitored or regulated, as depicted on FIGS. 4 and 5. The flow state actually present at the respective segment 10 is acquired by the flow state sensor arrangement 16, and the acquired actual flow state value is compared as a sensor signal 16a in a comparator 65 with the value of an input signal.

The actuating device can be configured in such a way as to send the current positioning commands or a current positioning signal vector 316 (FIG. 3) to the flow-influencing devices 16. It can here be provided that only one segment, all segments or a selection of segments be actuated with flow-influencing devices 16. It is preferably provided for segments 10 of the flow-influencing devices 16 that flow-influencing devices 16 of the same segment be activated in the same way. In one exemplary embodiment, a adjusting drive for activating flow-influencing devices 16 is part of all flow-influencing devices 16 of a segment, so that a respective positioning command is required in this embodiment per segment 10 for commanding the flow-influencing devices 16 of this segment.

The detection device for detecting unsteady flow states acting on the aircraft can be configured in such a way as to acquire desired flow states at the respective segments from the current sensor data of the flight status sensor arrangement 40 using the respective flow-influencing devices 16, compare them with the flow state measured by means of the respective flow state sensor arrangement 17, and assume that an unsteady flow state is present in the case of discrepancies that arise from the comparison between desired and actual values.

The actuating device can here have a function that performs a selection of flow-influencing devices 16 to be activated in order to minimize the influence of unsteady flow states on the aircraft. In one exemplary embodiment, the actuating device uses a regulator in particular to ascertain local desired flow state values segment by segment, i.e., the current positioning signal vector 316 incorporates positioning signals for each of the actuatable segments 10. The positioning command 316 or current positioning signal vector 316 can here be configured in such a way as to include a value for all activatable flow-influencing devices 16, wherein an adjusted value of zero is assigned to flow-influencing devices 16 that are not to be activated based on the selection and according to the respectively current positioning signal vector 316.

In another aspect of the invention, the detection device for detecting the unsteady flow states acting on the aircraft is functionally connected with the flight state sensor arrangement 40, and exhibits a filter function used to identify unsteady flow states.

In another aspect of the invention, the detection device exhibits sensors for detecting loads and/or displacements of turbulences acting on the aircraft. In particular, these sensors can be strain gauges secured to the surface of the aircraft structure, in particular the wings. The sensors for detecting loads and/or displacement are here spaced apart from the fuselage in a wingspan direction, and preferably distributed over the span of the wings. For example, at least one of these sensors is situated on the outer half of the wing viewed in the span direction.

Alternatively or additionally, the detection device can exhibit acceleration sensors, which are arranged on the wing for measuring accelerations that arise locally on the wing due to unsteady flow states acting on the aircraft. The acceleration sensors are here preferably also spaced apart from the fuselage in a wingspan direction, and preferably distributed over the span of the wings. For example, at least one of these sensors is situated on the outer half of the wing viewed in the span direction.

The detection device can further be configured in such a way as to ascertain desired values for the flow state on the surface segments 10; 11a, 12a; 11b, 12b as a function of the desired parameters 30a for the flight state data transmitted by the flight state sensor arrangement 40, and optionally also as a function of the desired parameters 30a of the presetting device 30 in order to set a distribution of lift over the span of the main wing M, and use the flow state data acquired with the respective flow state sensor arrangements 17 to find deviations, and from that determine the unsteady flow states acting on the aircraft. The aircraft F exhibits a flight state sensor arrangement 40 with an air data sensor arrangement 41 (air data system ADS) functionally connected with the actuating device C for acquiring flight state data to determine the flight state, as well as a flight position sensor arrangement or inertial sensor arrangement (inertial measurement unit, IMU) for ascertaining a flight state of the aircraft F, and in particular the rotational speeds of the aircraft F. The inertial sensor arrangement 42 is preferably situated inside the fuselage and in a so-called avionics bay. The air data sensor arrangement 41 exhibits air data sensors in the form of external measuring probes for determining the flight state of the aircraft F, and in particular the dynamic pressure, static pressure and temperature of the air flowing around the aircraft F. The flight position sensor arrangement 42 is used in particular to determine the rotational speeds of the aircraft F, including the yaw rates and roll rates of the aircraft, in order to ascertain its flight position. The flight controller receives the flight state sensor signals 40a of the sensor values acquired by the flight state sensor arrangement 40, in particular the air data sensor signals 41a of the air data sensor arrangement 41, along with the flight position sensor data 42a from the flight position sensor arrangement 42. In particular, the detection device can use the rotational speeds and/or accelerations ascertained by the inertial sensor arrangement 42 for detecting unsteady flow states acting on the aircraft. Alternatively or additionally, the detection device can use the dynamic pressures acquired by the air data sensor arrangement 41 to determine unsteady flow states acting on the aircraft.

The actuating function for influencing the flow state in the various segments of a wing 1; 1a, 1b is integrated into the flight control device 50 in the embodiment shown on FIG. 3, and receives the respective data from the flight state sensor arrangement 40. The actuating function is configured in such a way as to use the unsteady flow states detected by the detection device to actuate the flow-influencing devices 16 so as to minimize the influence of unsteady flow states on the aircraft by adjusting the effect of flow-influencing devices 16 on the unsteady flow states so that they are at least partially compensated. Therefore, the actuating device generates the corresponding control variables for activating the flow-influencing devices 16 in real time or in time intervals as a function of an acquired unsteady flow state. The actuating device can exhibit a flow state regulator 60, wherein the flow state that actually arises at the respective segments 10 due to the activation of the flow-influencing devices 16 is acquired in each segment by means of at least one flow state sensor arrangement 17, and the regulator 60 is actually approximated to the desired flow state for each segment 10 based on a desired/actual value comparison 65 between the respectively determined actual flow status in each segment and the desired flow state determined by the actuating function for the respective segment. Since the desired state constantly changes because the unsteady flow states to be compensated are time-dependent, the desired flow state generated by the actuating device also changes from one time increment to the next. Hence, the flow state regulator 60 works as a follow-up regulator, with the goal of keeping the actual flow close to the desired flow state, so as to minimize the influence of unsteady flow states on the aircraft, an in particular on the wing.

The actuating function for influencing the flow state in the various segments of a wing 1; 1a, 1b to generate positioning commands on the flow-influencing devices 16 to be used to approximately set the desired flow states to be adjusted in each segment in the respective time increment can exhibit an estimating function and/or a model of the aircraft F or wing designed for use in ascertaining the desired flow states in each segment based on the desired parameters 30a and/or the sensor signals 40a, and generating positioning commands 316 (FIG. 3), 460 (FIG. 4), 560 (FIG. 5) corresponding thereto.

The actuating function or device can be designed in such a way that the commands for the flow-influencing devices 16 are ascertained based on an indicator for the lift or for the ratio of the drag coefficient and lift coefficient on the respective segment or a reference location of the wing or a variable corresponding to such an indicator, which are generated based on desired parameters 30a for the presetting device 30 and/or based on the sensor signals 40a of the flight state sensor arrangement 40 and/or based on the flow states measured by the flow state sensor arrangements 17, in order to set the extent of the influence on flow caused by the flow-influencing devices 16. The actuating device can here be configured in such a way that these indicators for lift or for the ratio of the drag coefficient and lift coefficient for the respective segments or a reference location on the wing are stored in the actuating device as a function of input variables. As described, the input variables can be the desired parameters 30a of the presetting device 30 and/or the values of the sensor signals 40a for the flight state sensor arrangement 40 and/or the flow states measured by the flow state sensor devices 17. These indicators have computational significance, and are stored as pure computational variables, and hence factors or ratings for computational operations, with which the positioning commands for the flow-influencing devices 16 are ascertained. In this sense, the aforementioned indicators in the respective table can also be referred to as control indicators or control variables. These indicators can be generated in particular based on calibrations, and stored in the actuating device as tables or matrixes or value series, which contain values for a respective lift to be achieved. In order to compensate for an existing unsteady flow state, the actuating device can exhibit a function that ascertains the desired flow state value relevant at the time in question in the actuating device based on the desired parameters 30a for the flow-influencing device 30 and/or the sensor signals 40a of the flight state sensor arrangement 40 based on the flow states measured by the flow state sensor arrangements 17 by means of the indicators stored for the lift or the ratio of the drag coefficient and lift coefficient.

The value of a lift to be achieved can respectively correspond in particular to a lift coefficient or a ratio of the drag coefficient and lift coefficient, or be derived from one of these values. The value for a lift to be achieved or a desired flow state at a segment 10 of the wing surface or a reference location on the latter is generally an amount or value that causes a flight state according to the desired parameters 30a to be achieved, and is ascertained from tests and/or analyses, wherein it can respectively also correspond in particular to a lift coefficient that is local relative to the wing, or to a ratio of the drag coefficient and lift coefficient, or to a glide ratio in a surface segment, or can be derived from one of these values.

The mentioned reference location on the wing surface can be a significant region ascertained in a test and/or analysis, in which the unsteady flow states to be determined or compensated arise to a significant extent, so that this reference location ensures a sufficient effectiveness of the functions and operations according to the invention.

In addition, the actuating device can exhibit a positioning command determining function, which uses a regulator and/or observer function to determine the positioning command 316 (FIG. 3), 460 (FIG. 4), 560 (FIG. 5) or a current positioning signal vector 316 (FIG. 3), 416 (FIG. 4), 560 (FIG. 5) for commanding and activating the flow-influencing devices 16 of all segments based upon the value ascertained as relevant for the lift to be achieved for the respective point in time. Such an observer function can incorporate a mathematical model of an aircraft, which the actuating device uses to determine, based on input data in the form of the desired parameters 30a from the value for the lift to be achieved for the respective point in time, the positioning command or a current positioning signal vector, the commanding of which causes the aircraft to assume flight states corresponding to the positioning commands or positioning signal vectors.

Alternatively or additionally to the embodiments according to the invention, the invention can exhibit a gust amelioration function 36 (FIGS. 4 and 5), with which the positioning commands are relayed to the flow-influencing devices 16 in order to compensate for deviations of the flow states measured or determined by the respective flow-state sensor arrangements 17 from the determined desired values. In particular, the gust amelioration function 36 exhibits the actuating function for actuating the flow-influencing devices 16 according to one of the described embodiments of the latter, and is functionally coupled to the flight state regulator 70 in the depiction on FIGS. 4 and 5, and not integrated into the latter, so that the gust amelioration function 36 activates the flow-influencing devices 16 by relaying desired commands 36a to the flight state regulator 70 (FIG. 4) or desired commands 516 to the flow state regulator 60 (FIG. 5), in order to be able to counter the unsteady air forces triggered by gusts by activating the flow-influencing devices 16 on the wings 1, 1a, 1b. FIG. 5 shows the optional coupling of the gust amelioration function 36 to sensor arrangements 40, meaning in particular the air data sensor arrangement 41 and/or the inertial sensor arrangement 42 and/or acceleration sensors 39, which deliver input signals for detecting or transmitting an unsteady flow state to the actuating function. The acceleration sensors 39 are preferably arranged at locations of the wing for measuring accelerations that are exposed to unsteady flow states acting locally on the wing.

Sensors of the flight state sensor arrangement 40 can be used as sensors for detecting gusts. In particular, it can here be provided that the accelerations measured by the inertial sensor arrangement 42 and/or the rotational speeds be used to discover gusts or turbulences. The inertial sensor arrangement 42 is preferably situated in a so-called avionics bay inside the fuselage of the aircraft, so that the accelerations measured by the latter and/or the rotational speeds relate to a central location of the aircraft. However, tests have surprisingly demonstrated that these sensor signals are suitable for determining unsteady flow states, which are minimized according to the invention.

Alternatively or additionally, selected locations of the aircraft can also exhibit additional inertial sensors, i.e., acceleration sensors and/or rotational speed sensors, in order to detect gusts or turbulences. For example, acceleration sensors can be arranged on the wing, with several acceleration sensors being distributed over the span of the wing, acquiring the accelerations on the wing caused by gusts and turbulences on the wings, thereby detecting displacements of the latter. Rotational speed sensors can also be situated in particular in the fuselage region of the aircraft so as to acquire the rotational speeds from which gusts and turbulences are determined.

As an option, sensor signals of the flow state sensor arrangement 17 can also be used for detecting gusts and turbulences.

Alternatively or additionally, a flow state sensor arrangement 17 can also be used for detecting gusts and turbulences. It can here be provided that only one reference location on the wing has a flow state sensor arrangement 17. Alternatively, it can be provided that at least one flow state sensor arrangement 17 is arranged in each segment 10.

The embodiment on FIG. 4 provides that the gust amelioration function 36 used therein ascertains flow state control variables 36a to command the flow-influencing devices 16 using the positioning commands 416 for the flow-influencing devices 16 generated by the flow state regulator 70. The flow state regulator 70 can incorporate a function with which the flow state control variables 36a determined with the gust amelioration function 36 are offset with the positioning commands 470 ascertained by the flow state regulator 70 for activating the positioning devices 20 of the control flaps S, so that the effects from activating the flow-influencing devices 16 and the control flaps S do not negatively impact each other. It can here be provided in particular that a higher priority be assigned to commanding the control flaps S, e.g., at least an amplification factor of 2, if the effects impair each other. For example, the effects of the control flaps S and flow-influencing devices 16 can be assumed to have negatively impacted each other if both the control flaps S and flow-influencing devices 16 on a wing have been activated. One exemplary embodiment can provide that the flow state regulator 70 ascertains positioning commands 465 corrected based on these functions, which are relayed to the flow state regulator 70. Based on the latter, a regulation process performed with the comparator 65 is performed to compare the input signal with the actual flow state value as the sensor signal 62 of the flow state sensor arrangement 17 for each segment, wherein a control variable determination function 67 and the segment actuating function 68 are used to ascertain a flow state positioning command 460 for each segment 10, with which the load distribution to be set is achieved, or with which the flow-influencing devices 16 are correspondingly activated to counter the unsteady air forces caused by gusts.

In the embodiment according to FIG. 5, the gust amelioration function 36 is used to generate positioning commands for the flow-influencing devices 16, and relayed uncompensated to the flow state regulator 60 via the flight state regulator 70. A segment actuating function 537 can here be provided that determines a control variable 516 related to each individual segment from the output control variables 36a of the gust amelioration function. Such a segment actuating function 537 can also be provided and integrated in the additional embodiments according to the invention. The second segment actuating function 537 can exhibit a function which takes into account commands that in totality could not be implemented by the flow-influencing devices 16 of various segments 10 or would contradict each other, and ascertains a control variable 516 for the flow-influencing devices 16 of each segment that is optimal for the current point in time. However, it can alternatively be provided that the gust amelioration function 36 generates its parameters to the flow-influencing device 16 of each of the segments and relays them to the latter. The gust amelioration function 36 or segment actuating function 537 determines the strength with which each flow-influencing device 16 of each actuated segment 10 is to be respectively activated, and relays the corresponding positioning signals 516 to the flow-influencing device 16 of each individual segment.

The invention can also provide that the actuating function is functionally connected with a pilot interface in such a way that the pilot interface displays the adjusted position of the adjustable flap K and/or the extent that the flow influencing process was commanded or initiated by the flow-influencing devices 16, 16K.

In an embodiment of the invention, the flow-influencing devices 16a are designed as fluid-purging devices. In this case, the positioning commands can be used to command the volumetric flow of the fluid with which the fluid exits through outlet openings of the flow-influencing devices 16. Given a corresponding arrangement of adjustable flaps K on the main wing M, the adjustable flaps K can also be commanded for setting the size of the gap between the main wing M and the adjustable flap K.

The flow-influencing device 16 is designed in such a way that it can be used to influence the flow present on the respective surface, and hence the lift coefficient of the main wing M or adjustable flap K The flow-influencing device 16 can here be used in particular to also adjust the extent to which the flow present on the respective surface can be influenced. In one exemplary embodiment, the flow-influencing device 16 consists of an opening (not shown) and flow-generating device or flow conveying drive (not shown), which produces a purging or aspirating flow of air through the opening. The flow conveying drive can here be installed or integrated into a channel connected with the opening, and operate at a fixed capacity, or the latter can be designed in such a way that it can be used to change or control the inlet pressure and/or purging pressure and/or differential pressure in response to a corresponding actuation by means of an actuating function.

The flow-influencing device 16 can alternatively or additionally also exhibit a purging opening changing device or aspiration opening changing device, with which the opening of a channel inside the main wing M or adjustable flap K empties into the environment on the surface, wherein the channel flows into or out of another location of the main wing M or adjustable flap K. In this way, the amount of air respectively streaming through the opening can be controlled or adjusted with the purging opening changing device or aspiration opening changing device.

The flow state sensor arrangement 15 can exhibit one or more sensors for acquiring the flow state of the flow present or detached on the upper side of the high-lift flap. The sensor or several sensors can be comprised of a heat wire sensor for acquiring the flow velocity. Further, the sensor or several sensors can consist of a piezo wall shear stress sensor to acquire the wall shear stress. The sensor or several sensors can here be comprised of a hot film sensor for acquiring the wall shear stress.

The sensor or several sensors can generally consist of a sensor for acquiring the properties of the flow state on the upper side of the main wing M or the flap K, and be designed in such a way that the flow state can clearly be determined using the signal generated by the sensor, i.e., so as to determine whether a present or detached flow is present, or to detect or acquire.

In addition, it can be provided that the flow state sensor arrangement 17 in the mentioned channel be furnished inside the flap K, so as to acquire flow states in a channel or several channels in the high-lift flap and/or in the main wing by means of a corresponding sensor arrangement, and relay them as flow values to the high-lift flap adjustment device for verifying the flow states and changing the actuation or regulation of devices for influencing the flow.

Figure 6:
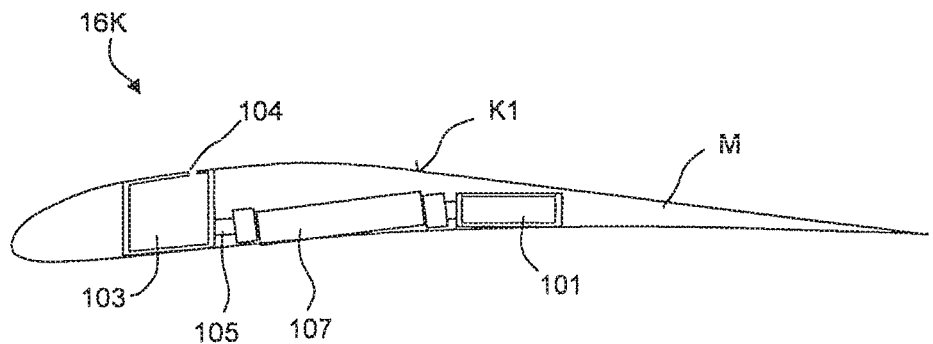
FIG. 6 a sectional view of an exemplary embodiment of the flow-influencing device provided according to the invention, for example which is built into an adjustable flap, FIG. 7 a perspective, diagrammatic view of the flow-influencing device shown on FIG. 5, FIG. 8 a diagrammatic view of a wing with a main wing and adjustable flap coupled thereto in the form of a high-lift flap, the upper side of which accommodates an arrangement of purging openings of a flow-influencing device provided according to the invention.

FIG. 6 shows an exemplary embodiment of the flow-influencing device 16 of a segment provided according to the invention. The flow-influencing device 16 here consists of a pressure chamber 101 for receiving compressed air, an outlet chamber or purging chamber 103 and one or more connecting lines 105 for linking the pressure chamber 101 with the outlet chamber 103. The purging chamber 103 exhibits at least one outlet opening or purging opening, and preferably an arrangement 110 of outlet openings or purging openings. For illustrative purposes only, FIG. 6 depicts a single purging opening 104. The at least one connecting line 105 integrates at least one valve arrangement 107, which is functionally connected with the actuating device C. The actuating device actuates the valve arrangement 107 using the current positioning signal vector or positioning command 316, 460, 560, so that compressed air present in the pressure chamber 101 is allowed to stream into the outlet chamber 103 at a corresponding velocity and/or throughput or not at all, based on the adjusted values of the current positioning signal vector or positioning command 316, 460, 560, from where the air exits through an arrangement 110 of purging openings, so as to influence how the air streams around the surface K1 of the adjustable flap K.

Compressed air can be introduced into the pressure chamber 101 in various ways, in particular by means of a pressure generator. It can here be provided that the compressed air is taken from a dynamic pressure area on the surface of a flow body of the aircraft, and in particular at the adjustable flap or main wing from the outer flow. The pressure chamber can also be hooked up to a pressure generator, a pump or a flow variator, which receives air by way of a feed line. In particular, the feed line can proceed from an opening or an arrangement of openings on the upper side of the main wing M. This opening can here be situated at a location, or the arrangement of openings can be distributed over a region of the main wing M, provided in such a way that aspirating effects arise at these positions, which correlate with the purging effects generated at the arrangement 110 of purging openings in a predetermined manner.

The flow-influencing device 16 shown on FIG. 6 after built in is diagrammatically depicted as a structurally isolated device on FIG. 6. FIG. 6 presents a diagrammatic view of a wing with a main wing M, the upper side of which accommodates an arrangement 110 of purging openings provided according to the invention.

Figure 7:
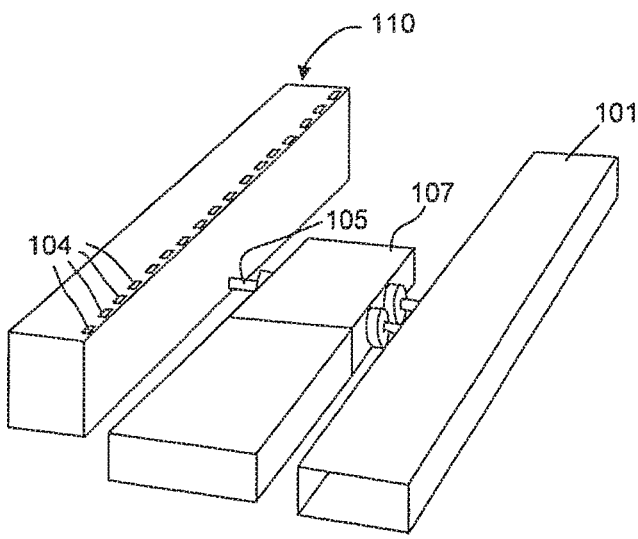
Figure 8:
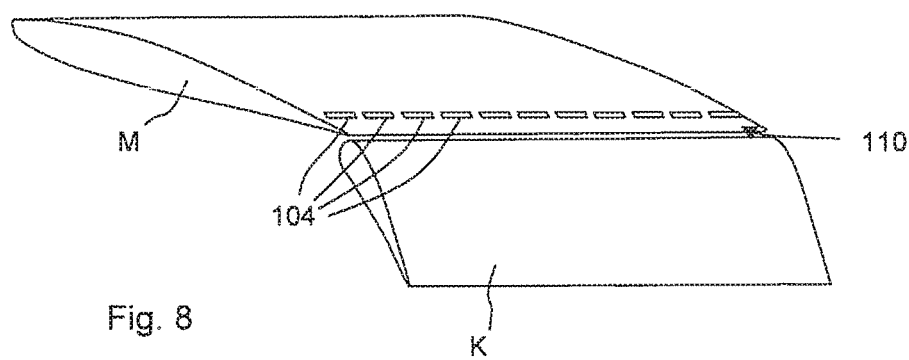
Figure 9:
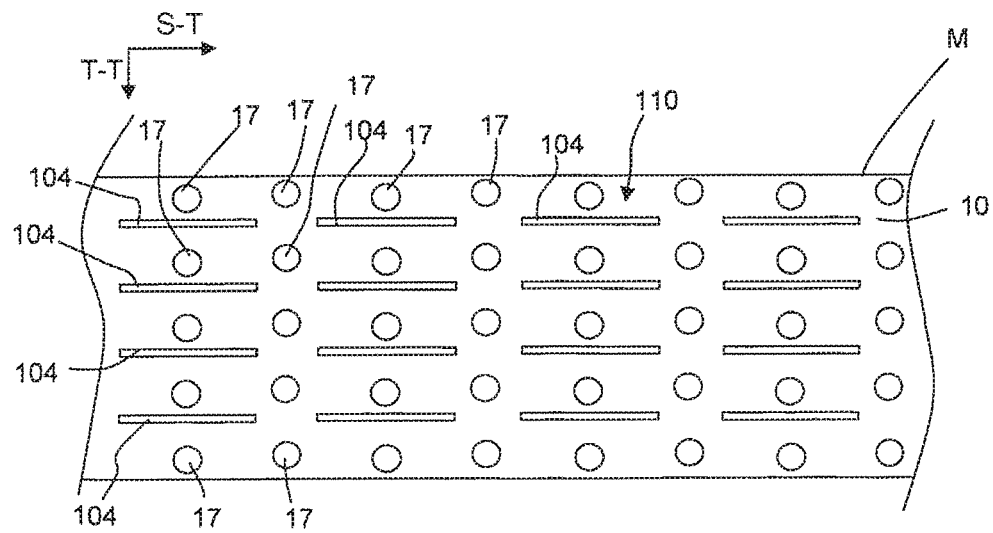
FIG. 9 a top view of a surface segment of an adjustable flap, for example with a completed arrangement of flow-influencing devices and flow state-flow-influencing devices.

The arrangement 110 of purging openings or the opening device preferably consists of an arrangement of in particular slit-shaped openings (FIG. 7 to 9). The invention preferably provides that the purging openings fluidically connected with one or more purging chambers are distributed over a surface segment of the flow body of the aircraft. Several surface segments can here be arranged next to or behind each other viewed in the direction of flow S, so as to influence the flow over a larger area of the flow body. The actuating function determines the positioning commands and adjusted values corresponding thereto for the flow-influencing devices 16 of each actuatable segment 10 of segments 10 distributed over the flow body or main wing with such arrangements 15 of flow-influencing devices 16 and flow state sensor arrangements 17.

FIG. 9 presents an exemplary top view of a surface segment 10, with an arrangement 15K of flow-influencing devices and flow state sensor arrangements, which in the invention can generally be arranged in a surface segment of the main wing or adjustable flap K and in general a flow body of the aircraft F. The arrangement shown on FIG. 8 exhibits a matrix-like arrangement 110 of purging openings 104 distributed over the surface segment 10. In general, the purging openings 104 of the arrangement 110 of outlet openings are distributed over the respective surface segment, so as to influence the flow on or above the entire area of the surface segment 10. A pressure chamber and valve arrangement 107 is preferably allocated to the openings 104 of a surface segment 10. As an alternative, it can also be provided that a pressure chamber 101 is allocated to the openings 104 of several surface segments 10.

The purging openings 104 exhibit an optimal shape for influencing the flow around the respective surface segment 10. It can here be provided that various shapes of purging openings 104 be used inside a surface segment 10. For example, the purging openings 104 can also be circular, ellipsoid or sickle-shaped.

Also arranged inside a surface segment are a plurality of flow state sensor arrangement 17, which are diagrammatically depicted on FIG. 9 as circular symbols.

All provided flow state sensor arrangements 17 are functionally linked to the actuating device for relaying current flow states to the location of the respective flow state sensor arrangement 17 or respective segments in the form of the sensor signals respectively generated by each flow state sensor arrangement 17. In the actuating device, the measured flow states are used as the basis to determine at which purging opening 104 and with what force air is to be purged for each segment, in order to set a flight state for the aircraft that corresponds to the positioning commands generated by the presetting device 30 for generating flight states of the aircraft.

Different surface segments can be arranged next to each other or overlap on the surface of the aspirating side and/or pressure side of the flow body, e.g., the main wing.

It can also be provided that the actuating device use flow states ascertained by means of flow state sensor arrangements 17 situated in other surface segments 10 in order to determine positioning commands of flow-influencing devices 16.

In light of the corresponding function of the actuating device, the latter commands the flow-influencing devices 16 of one or more surface segments 10 in order to in particular also set the extent to which the flow present on the respective surface segments 10 can be influenced. To this end, corresponding values for the current positioning signal vector are determined. The actuating device here actuates a adjusting drive and, for example, the valve arrangements 107 of several surface segments 10. Pulsed purging can here be provided in particular.

Alternatively and additionally, it can be provided that the actuating device C use current positioning signal vectors or positioning commands to command the flow-influencing devices 16 to actuate an opening device on the respective purging openings 104, so as to adjust the purging flow on the respective purging opening 104 by opening and closing the latter.

Additionally or alternatively to the above, it can be provided that the actuating device be functionally linked to a pressure generator or flow conveying drive (not shown) coupled to the pressure chamber, so as to correspondingly actuate the pressure generator to set the pressure in the pressure chamber, and in this way adjust the purging rate at the openings 104 of a surface segment 10. It can here be provided in particular to set the pressure in the pressure chamber based on the flight state, and in particular based on the flight speeds and flight altitude, or variables derived from the latter, by means of a positioning signal vector or positioning commands. It can also be provided that the actuating device deactivates the pressure generator by means of a positioning signal vector or positioning commands in certain flight state ranges, e.g., while cruising. In general, the pressure generator can also operate at a fixed capacity, or be configured in such a way as to be correspondingly actuated with an actuating function to change or control the inlet pressure and/or purging pressure and/or differential pressure.

The flow conveying drive can here be installed or integrated in a channel connected with the opening.

The medium used to prepare the compressed air can be furnished in different ways, e.g., by the propulsion system, an auxiliary turbine (e.g., a so-called auxiliary power unit or APU), via the air conditioning system intakes, through openings of a fairing, e.g., the adjustable flap, through any other openings/aspirating locations, e.g., in the leading edge region of the wing and/or side edge region of flaps. Flow conveying drives can here additionally be integrated with the air sources in the corresponding connecting channels, in order to provide the corresponding pressure and/or mass flow.

In these embodiments of the invention, the mass or volumetric flow in the flow-influencing devices 16 or a variable corresponding thereto can be provided as a regulating variable, i.e., as a variable or control variable to be set by means of the actuating device, wherein the mentioned valve arrangement and/or pressure generator or flow conveying drive mentioned in the respective exemplary embodiment are actuated by the positioning signal vector or positioning command.

In an alternative design of the flow-influencing devices 16, the latter can be comprised of a respective piezoelectric actuator, so that the positioning signal vectors or positioning commands can be used to command the voltage applied to the piezoelectric actuators. If the design of the flow-influencing devices 16 involves plasma actuators or nuclear energy based actuators, the positioning signal vectors or positioning commands are used to command the amperage for controlling the latter and/or the voltage to be applied to the latter. In addition, the flow-influencing devices 16 can also consist of actuators based on chemical processes, wherein positioning signal vectors CS or positioning commands CS determine the concentration of a chemical substances, such as a catalyst, for example that triggers chemical reactions, such as small explosions.

In particular in the exemplary embodiment shown on FIG. 3, the actuating device C can here in particular exhibit a regulating algorithm, which controls the mentioned input values based on the desired commands 30*a* received by the latter ("complete control").

The regulating algorithm of the actuating device C can use sensor data (in particular pressure sensors as the sensor arrangement 17 on the wing or flap K) to synthesize a measure for the lift, drag and glide ratio on the one hand, and be designed as a robust regulating algorithm for achieving a prescribed target for the above measure on the other. The regulator is supported by an anti-wind-up reset structure. The measure is derived from a combination of chronological integration and reference tables, and can be unambiguously linked with a flight-relevant variable, e.g., lift. This indirectly enables the stipulation of a lift or lift coefficient, for example, which is then converted by the algorithm into a parameter for the absolute measure. This parameter for the absolute measure, hereinafter referred to as the desired value, is used to ascertain the difference relative to the current absolute measure, which then determines the strength and type of regulatory action.

The regulator of the actuating function can be designed based on a linear multivariable black-box model, with a method for synthesizing robust regulators. When the linear multivariable black-box model is identified, suitable spurious signals are generated in the form of sudden changes in the actuation variable, and the reaction by the absolute measure to the latter is measured. The dynamic behavior of the reaction is used to derive a linear differential equation system by means of parameter identification methods, which represents the basis for regulator synthesis. Many different identifications of this type deliver a model family, from which a representative or average model is selected per synthesis. Regulator synthesis can involve the use of methods (e.g., Ho-synthesis, robustification, robust loop shaping). The resultant classic, linear control circuit can be supported by an anti-wind-up reset structure, which, given a request for the control variable that exceeds the realizable control variable, corrects the internal states of the regulator in such a way that prevents an integration part in the regulator from causing the regulator to overshoot or lock up. As a result, the regulator remains able to respond even given an unrealistic request, which increases operational safety. It is always adjusted to the current situation, without exhibiting any delays caused by preceding control variable limitations.

In particular, the regulator can be designed as an optimal regulator, which receives all necessary input variables as regulating variables, and uses a regulating method algorithm in a matrix-like process to generate the various output signals for the flow-influencing device 16 and/or the actuator 21 or flap drive of the at least one actuated adjustable flap K, based upon calibrations and parameters derived from the latter for allocating regulating variables and control variables as a function of flight state variables.

Therefore, the invention involves determining a flight-relevant indicator (lift, lift coefficient, drag, glide ratio, etc.) in an unsteady state from substitute regulating variables, then using this indicator for a desired value comparison, and finally adjusting in principle any value desired—within the framework of physics—for the respective indicator in this way, and achieving it by means of linear, robust regulating algorithms configured on a linear model.

Because it does without heavier moving parts, the regulating system is here distinctly faster than conventional, mechanical solutions, making it possible to specifically suppress or utilize local flow phenomena.

The invention claimed is:

1. An aircraft comprising:
   wings, wherein each wing comprises:
   a respective main wing,
   at least one control flap adjustably arranged relative to the respective main wing,
   an adjusting drive that activates the at least one control flap, and
   a sensor arrangement configured to acquire a setting position of the at least one control flap,
   a system that minimizes an influence of unsteady flow states;
   a presetting device that generates desired parameters corresponding to flight states of the aircraft;
   a flight state sensor arrangement configured to generate flight state data; and
   a flight control device, which is functionally connected with the flight state sensor arrangement, the presetting device, the adjusting drive, and the sensor arrangement, and that acquires the setting position of the at least one control flap, so as to adjust the aircraft to the flight states corresponding to the desired parameters;
   wherein the system that minimizes the influence of the unsteady flow states comprises:
      at least one arrangement of flow-influencing devices functionally connected with the flight control device and incorporated in at least one surface segment of each main wing of each wing extending in a respective wingspan direction or the at least one control flap, and
      a detection device for detecting unsteady flow states acting on the aircraft, wherein the detection device is functionally connected with the flight control device,
      wherein the flight control device is programmed with an actuating function that influences the flow in the at least one segment of each main wing or the at least one control flap of each wing, the flight control device being designed in such a way that the flight control device programmed with the actuating function, based on the unsteady flow states detected by the detection device and setting position of the at least one control flap acquired by the sensor arrangement, actuates the flow-influencing devices so as to minimize the influence of the unsteady free flow states on the aircraft.

2. An aircraft comprising
   wings, each of which comprises:
   a respective main wing,
   at least one control flap adjustably arranged relative to the respective main wing,
   an adjusting drive that activates the at least one control flap,
   a sensor arrangement configured to acquire a setting position of the at least one control flap, and
   at least one trailing edge flap;
   a system that minimizes an influence of unsteady flow states;
   a presetting device that generates desired parameters corresponding to flight states of the aircraft;
   a flight state sensor arrangement configured to generate flight state data; and
   a flight control device, which is functionally connected with the flight state sensor arrangement, the presetting device, the adjusting drive, and the sensor arrangement, and that acquires the setting position of the at least one control flap, so as to set the aircraft to the flight states corresponding to the desired parameters;
   wherein the system that minimizes the influence of the unsteady flow states comprises:
      at least one arrangement of flow-influencing devices functionally connected with the flight control device and incorporated in at least one surface segment of each of the at least one trailing edge flap of each wing extending in a respective wingspan direction that influence fluid flow over the at least one surface segment, and
      a detection device that detects the unsteady flow states acting on the aircraft, wherein the detection device is functionally connected with the flight control device,
      wherein the flight control device is programmed with an actuating function that influences the flow in the at least one surface segment of each of the at least one trailing edge flap of each wing, the flight control device being designed in such a way that the flight control device programmed with the actuating function, based on the unsteady flow states detected by the detection device and setting position of the at least one control flap acquired by the sensor arrangement, actuates the flow-influencing devices so as to minimize the influence of the unsteady flow states on the aircraft.

3. The aircraft according to claim 2, wherein the system for minimizing the influence of the unsteady flow states comprises:
   at least one arrangement of the flow-influencing devices for influencing the fluid flow over at least one surface segment of the main wing, which are functionally connected with the flight control device, and incorporated in the at least one surface segment of the main wing of each of the wings extending in the respective wingspan direction or the at least one control flap;
   wherein the flight control device is programmed with an actuating function that influences the fluid flow in the at least one surface segment of the main wing, the flight control device being designed in such a way that the flight control device programmed with the actuating function, based on the unsteady flow states detected by the detection device and setting position of the control flap acquired by the sensor arrangement, actuates the flow-influencing devices so as to minimize the influence of the unsteady free flow states on the aircraft.

4. The aircraft according to claim 2, wherein the flight control device programmed with the actuating function is configured so that commands for the flow-influencing devices are taken into account with respect to controlling the aircraft according to the commands for the at least one control flap.

5. The aircraft according to claim 2, wherein at least one surface segment of the main wing of each wing extending at least in the respective wingspan direction incorporates an arrangement of flow-influencing devices for influencing the fluid flow over the at least one surface segment of the main wing and at least one flow state sensor arrangement configured to measure the flow state in the respective surface segment, which is functionally connected with the actuating device, wherein the actuating device for each segment determines actual values for the flow state in the respective segment from the flow state sensor arrangement respectively accompanying the latter, and actuates the flow-influencing devices in such a way that the desired values ascertained by the actuating device are desired for minimizing the influence of unsteady free flow states.

6. The aircraft according to claim 2, wherein the detection device for detecting unsteady flow states acting on the aircraft is functionally connected with the flight state sensor arrangement and the detection device is programmed with a filter function that performs a function used to identify unsteady flow states; and the detection device is programmed with the actuating function for influencing the fluid flow in the at least one surface segment of the at least one trailing edge flap of the wing that is designed to use the identified unsteady flow states to actuate the flow-influencing devices in such a way as to influence the flow of the fluid flowing over the surface segment to reduce the effects of the unsteady free flow states on the aircraft.

7. The aircraft according to claim 2, wherein:
the detection device for detecting unsteady flow states acting on the aircraft is functionally connected with the flow state sensor arrangement;
the detection device is programmed with a filter function that performs a function used to identify unsteady flow states; and
the detection device is programmed with the actuating function for influencing the flow in the different segments of a wing that is designed to use the identified unsteady flow states to actuate the flow-influencing devices in such a way as to influence the flow of the fluid flowing over the surface segment to reduce the effects of the unsteady flow states on the aircraft.

8. The aircraft according to claim 2, wherein:
the detection device exhibits sensors for detecting loads and/or displacements of turbulences acting on the aircraft; and
the actuating function for influencing the flow in the different segments of a wing is functionally connected with the detection device and designed to use the identified unsteady flow states to actuate the flow-influencing devices in such a way as to influence the flow of the fluid flow over the surface segment to reduce the effects of the unsteady flow states on the aircraft.

9. The aircraft according to claim 2, wherein the detection device is functionally connected with the flight state sensor arrangement, and wherein the detection device is designed in such a way as to ascertain desired values for the flow state on the surface segments as a function of the flight state data transferred by the flight state sensor arrangement in order to set a distribution of lift over the span of the main wing, and use the flow state data ascertained by the respective flow state sensor arrangements to find deviations, and from that to derive unsteady flow states acting on the aircraft.

10. The aircraft according to claim 2, wherein the detection device exhibits acceleration sensors, which are arranged on the wing for measuring accelerations that locally arise on the wing due to unsteady flow states acting on the aircraft.

11. The aircraft according to claim 2, wherein the arrangement of flow-influencing devices is comprised of flow passage openings situated in one segment or several segments, and of a flow-generating device situated in each wing for exhaust or aspiration purposes, through which fluid is purged from the flow passage openings, so as to influence the lift coefficient locally arising at the segment.

12. The aircraft according to claim 11, wherein the flow-generating device is designed to generate a continuous volumetric flow in order to reduce the effects of unsteady flow states on the aircraft when it is activated by the flight control device programmed with the actuating function.

13. The aircraft according to claim 11, wherein the flow-generating device is designed in such a way as to generate a pulsed volumetric flow in order to reduce the effects of unsteady flow states on the aircraft when it is activated by the flight control device programmed with the actuating function.

14. The aircraft according to claim 13, wherein the flight control device programmed with the actuating function performs a function that generates the frequency of the pulsed volumetric flow depending on the values for unsteady flow states ascertained by the detection device in order to reduce the influence of unsteady flow states on the aircraft.

15. The aircraft according to claim 11, wherein the flow-generating device, in order to reduce the effects of the unsteady flow states on the aircraft, is designed to generate an aspiration and purging of a volumetric flow, which is drawn by an actuator into an actuator chamber, or which is ejected from the actuator chamber.

16. The aircraft according to claim 2, wherein the arrangement of flow-influencing devices comprises flow passage openings arranged in a segment or several segments, and a suction device situated in the wing and flow-connected with aspirating openings, through which fluid is aspirated from the flow passage openings to influence the lift coefficient locally arising at the segment.

17. The aircraft according to claim 2, wherein the arrangement of flow-influencing devices consists of loudspeaker devices situated in the at least one surface segment or several segments, which, when activated, generate air oscillations that influence the lift coefficient locally arising at the at least one surface segment.

18. The aircraft according to claim 2, wherein the arrangement of flow-influencing devices comprises piezo actuators situated on the surface of the wing, which are arranged in the at least one surface segment or several segments, and, when activated, generate air oscillations that influence the lift coefficient locally arising at the at least one surface segment.

19. The aircraft according to claim 18, wherein the arrangement of flow-influencing devices further comprises an adjustable flap and actuator that adjusts the adjustable flap, wherein the desired commands for the flow-influencing devices are comprised of desired commands for the flow-generating device and desired commands for an actuator for adjusting the adjustable flap.

20. The aircraft according to claim 2, wherein the at least one surface segment of the at least one trailing edge flap of each wing comprises several segments arranged one in back of the other as viewed in the wingspan direction.

* * * * *